(12) United States Patent
Yang et al.

(10) Patent No.: US 12,066,697 B2
(45) Date of Patent: Aug. 20, 2024

(54) QUANTUM DOT LIGHT DIFFUSER PLATE AND METHOD FOR MAKING THE SAME

(71) Applicant: Entire Technology Co., Ltd., Taoyuan (TW)

(72) Inventors: Chih-Wen Yang, Taoyuan (TW); Yu Wei Chang, Taoyuan (TW)

(73) Assignee: Entire Technology Co., Ltd., Taoyuan (TW)

( * ) Notice: Subject to any disclaimer, the term of this patent is extended or adjusted under 35 U.S.C. 154(b) by 141 days.

(21) Appl. No.: 17/875,047

(22) Filed: Jul. 27, 2022

(65) Prior Publication Data

US 2023/0229027 A1   Jul. 20, 2023

(30) Foreign Application Priority Data

Jan. 17, 2022   (TW) .................................. 111101887

(51) Int. Cl.
    *G02F 1/017*     (2006.01)
    *G02F 1/13357*     (2006.01)

(52) U.S. Cl.
    CPC .... *G02F 1/01791* (2021.01); *G02F 1/133603* (2013.01); *G02F 1/133606* (2013.01)

(58) Field of Classification Search
None
See application file for complete search history.

(56) References Cited

U.S. PATENT DOCUMENTS

| | | | | |
|---|---|---|---|---|
| 2010/0283037 A1* | 11/2010 | Omata | ................. | C09K 11/621 |
| | | | | 257/14 |
| 2018/0341151 A1* | 11/2018 | Kurita | ............... | G02F 1/133608 |
| 2019/0163009 A1* | 5/2019 | Lee | ...................... | H10K 50/865 |

\* cited by examiner

*Primary Examiner* — Lucy P Chien

(57) ABSTRACT

The invention refers to a quantum dot light diffuser plate that can be assembled on a backlight module with blue LEDs as the bottom light source. Microstructures having concave portions and convex portions are formed on the surface of the diffuser plate. A quantum dot layer comprising green quantum dots and red quantum dots is applied only on the concave portions of the microstructures, and thus is separated by the convex portions into small parts independent of each other. A water-blocking and gas-blocking layer is arranged on the upper surface of the quantum dot layer. The water vapor and oxygen from the outside cannot penetrate the side end faces of the quantum dot layer and invade the entire quantum dot layer, such that, the diffuser plate of the invention can have the advantages of simple process, low cost and high production yield.

16 Claims, 4 Drawing Sheets ated Jan. 17, 2022, the subject matter of which is incorporated herein by reference.

QUANTUM DOT LIGHT DIFFUSER PLATE AND METHOD FOR MAKING THE SAME

This application claims the benefit of Taiwan Patent Application Serial No. 111101887 filed Jan. 17, 2022, the subject matter of which is incorporated herein by reference.

BACKGROUND OF INVENTION

1. Field of the Invention

The present invention relates to a quantum dot light diffuser plate and a method for making the same, especially refers to a light diffuser plate that can be assembled in a backlight module and can prevent the quantum dot layer on the light diffuser plate from reducing activity due to intrusion of water vapor and oxygen.

2. Description of the Prior Art

Under the development of the backlight displays, there are mainly two types of light emitting diode (LED) light sources used in traditional backlight displays; one is for blue LED to excite yellow phosphor, and the two colors are mixed into white light; the other one is for three primary color LEDs to be mixed into white light. However, the color gamut of the conventional backlight displays of these two light sources is relatively low, and the color representation is insufficient.

At present, the light source of the backlight display uses blue LEDs as light sources to excite green and red quantum dots, and the three colors of light are mixed into white light, which can increase the color gamut value to NTSC 120%. However, this backlight display still has the following disadvantages. First of all, quantum dots are easily affected by water vapor and oxygen to reduce or even lose their activity. After long-term use, quantum dots will fail, resulting in abnormal display color problems. Secondly, blue LEDs excite green and red quantum dots, and blue, green, and red light are mixed into white light, and the light intensity must be consistent to avoid insufficient red/green light conversion. However, because the surrounding light intensity is lower than the central light intensity, the phenomenon of blue light is caused in the surrounding area, and the color is uneven. Furthermore, most of the existing quantum dot films block water vapor and oxygen by attaching a water-blocking and gas-blocking film on the surface, but this method can only block the water vapor and oxygen from entering the quantum dot film from the upper surface, and cannot prevent water vapor and oxygen entering from the side end faces of the quantum dot film. Therefore, after a period time of use, the four sides of the quantum dot film of the backlight display will still be invaded by water vapor and oxygen to make the quantum dots ineffective, resulting in abnormal color in the surrounding area of the backlight display. Although some manufacturers have tried to coat the four side end faces of the quantum dot film of the backlight display with protective coatings, this method requires multiple processing processes, which is complicated, high cost and low yield.

Therefore, the present invention provides a quantum dot light diffuser plate and a manufacturing method thereof, which can be assembled in a backlight module and can prevent the quantum dot layer on the light diffuser plate from reducing the activity due to the intrusion of water vapor and oxygen, so as to avoid various deficiencies of the aforementioned conventional backlight displays.

SUMMARY OF THE INVENTION

The primary objective of the present invention is to provide a quantum dot light diffuser plate which can be assembled on a backlight module with a plurality of blue light emitting diodes (LEDs) as the bottom light source. A plurality of microstructures having a plurality of concave portions and convex portions are formed on the surface of the diffuser plate. A quantum dot layer comprising a plurality of green quantum dots and a plurality of red quantum dots is applied on the concave portions of the microstructures. Then, a water-blocking and gas-blocking layer is arranged on the upper surface of the quantum dot layer. The quantum dot layer located in the concave portions is separated by the convex portions of the microstructures into small parts independent of each other. In this way, the water vapor and oxygen from the outside cannot penetrate the four side end faces of the quantum dot layer and invade the entire quantum dot layer, such that, the diffuser plate of the invention can have the advantages of simple process, low cost and high production yield.

In order to achieve aforementioned objective, the present invention discloses a quantum dot light diffuser plate capable of being assembled on a backlight module with a plurality of blue light emitting diodes (LEDs). The backlight module comprises a substrate and the blue LEDs arranged on the substrate in an array form. The quantum dot light diffuser plate is located above the substrate and comprises:

a plate body, having an upper surface and a lower surface; the lower surface facing the substrate;

a plurality of microstructures, formed on the upper surface of the plate body in an array form; the microstructures forming a plurality of convex portions and a plurality of concave portions on the upper surface of the plate body; the concave portions being separated by the convex portions, such that the concave parts are independent and not communicated with each other;

a quantum dot layer, disposed at the plurality of the concave portions on the upper surface of the plate body; wherein, a thickness of the quantum dot layer is t1, a distance from a top of the convex portions to a bottom of the concave portions is t2; wherein t1<t2; and a water-blocking and gas-blocking layer, disposed on the upper surface of the plate body and covering the plurality of the convex portions and the quantum dot layer.

In a preferred embodiment, the lower surface of the board body is also formed with the plurality of the microstructures, the quantum dot layer and the water-blocking and gas-blocking layer; the microstructures form the convex portions and the concave portions on the lower surface of the plate body; the concave portions on the lower surface are separated by the convex portions, so the concave portions on the lower surface of the plate body are independent and not communicated with each other; the quantum dot layer located on the lower surface of the plate body is disposed at the concave portions on the lower surface of the plate body.

In a preferred embodiment, a plurality of quantum dots is included in the quantum dot layer; the quantum dots are nanocrystal semiconductor materials composed of II-VI, III-V or IV-VI group elements; a grain diameter of each of the quantum dots is between 2 nm and 10 nm; wherein, the quantum dots include a plurality of green quantum dots with light emission wavelengths of 520-530 nm and a plurality of red quantum dots with light emission wavelengths of 620-630 nm.

In a preferred embodiment, the microstructures include a plurality of N-sided pyramids, wherein N is a positive integer greater than or equal to three; t2 is between 6~200 µm; a thickness of the water-blocking and gas-blocking layer is t3, and t3 is between 5~100 µm.

In a preferred embodiment, t2 is between 25 and 50 µm, t1 is between 10 and 40 µm, and t3 is between 10 and 30 µm.

In a preferred embodiment, a maximum width of the convex portion is between 50 and 500 µm, and a distance between two adjacent convex portions is between 50 and 1000 µm.

In a preferred embodiment, the plate body comprises one of the following material: polycarbonate (PC), polystyrene (PS), polymethyl methacrylate (PMMA), polyethylene (PE), polypropylene (PP), polyethylene terephthalate (PET).

In a preferred embodiment, the plate body is formed by foam extrusion molding, and includes a plurality of microbubbles in the plate body; a weight reduction rate of the microbubbles to the plate body is 15-25%, and an average size of the microbubbles is between 60~800 µm; wherein, a calculation formula of the weight reduction rate is:

$$\text{weight reduction rate (\%)}=(W1-W2)/W2*100\%;$$

$$W1=H*(L1*L2*D);$$

wherein:
H is an average thickness of the plate body (mm);
L1 is a length of the plate body (mm);
L2 is a width of the plate body (mm);
D is a density of a raw material of the plate body (g/mm$^3$);
W1 is a theoretical weight (g) of the plate body, that is, the weight when the microbubbles are not included;
W2 is an actual weight (g) of the plate body, that is, the actual weight of the plate body containing a plurality of the microbubbles is actually weighed by a scale.

In a preferred embodiment, the microbubbles are generated by adding a foaming agent and a nucleating agent during the foam extrusion molding of the plate body; the nucleating agent comprises at least one of the following: calcium carbonate, silicon dioxide, and calcium oxide; a weight percentage of the added nucleating agent is 0.1%-0.5%.

In a preferred embodiment, the plate body is a multi-layer structure composed of at least two layers of different materials by co-extrusion molding.

In order to achieve aforementioned objective, the present invention discloses a method for making a quantum dot light diffuser plate, comprising the following steps:

manufacturing a plate body by using a foam extrusion molding process; the plate body having an upper surface and a lower surface; and, a plurality of microstructures being formed on at least the upper surface of the plate body; the microstructures being arranged on the upper surface of the plate body in an array form; the microstructures forming a plurality of convex portions and a plurality of concave portions on the upper surface of the plate body; the concave portions being separated by the convex portions, such that the concave portions are independent and do not communicate with each other;

coating a quantum dot layer on the concave portions on the upper surface of the plate body by a coating process; wherein, a thickness of the quantum dot layer is t1, a distance from a top of the convex portions to a bottom of the concave portions is t2; wherein t1<t2; and through a sticking process, attaching a water-blocking and gas-blocking layer onto the upper surface of the plate body in order to cover the plurality of the convex portions and the quantum dot layer.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The present invention refers to a quantum dot light diffuser plate and its manufacturing method. The light diffuser plate can be assembled on a backlight module with a plurality of blue light emitting diodes (LEDs) as the bottom light source. A plurality of microstructures having a plurality of concave portions and convex portions are formed on the surface of the diffuser plate. A quantum dot layer comprising a plurality of green quantum dots and a plurality of red quantum dots is applied on the concave portions of the microstructures. Then, a water-blocking and gas-blocking layer is arranged on the upper surface of the quantum dot layer. The quantum dot layer located in the concave portions is separated by the convex portions of the microstructures into small parts independent of each other. In this way, the water vapor and oxygen from the outside cannot penetrate the four side end faces of the quantum dot layer and invade the entire quantum dot layer, such that, the diffuser plate of the invention can have the advantages of simple process, low cost and high production yield. In the present invention, the upper surface of the diffuser plate is attached with the water-blocking and gas-blocking layer, in addition, the water vapor is prevented by the microstructures from entering the quantum dot layer from the side end faces, so that the distance of the water vapor entering the quantum dot layer from the side end faces is reduced to a minimum. In addition, because the diffuser plate and the microstructures formed thereon are integrally formed by extrusion process, subsequent processing and production costs can be reduced, and a relatively high production yield can be achieved.

In order to more clearly describe the quantum dot light diffuser plate and its manufacturing method proposed by the present invention, the following will be described in detail with the accompanying drawings.

Figure 1:
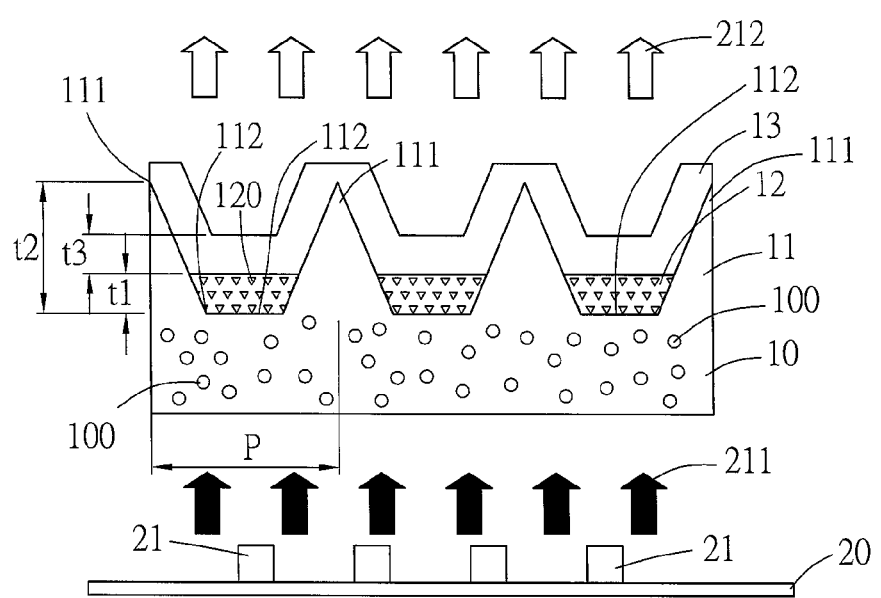
FIG. 1 is a cross-sectional schematic diagram of an embodiment of the quantum dot light diffuser plate of the present invention installed on a backlight module.
Figure 2:
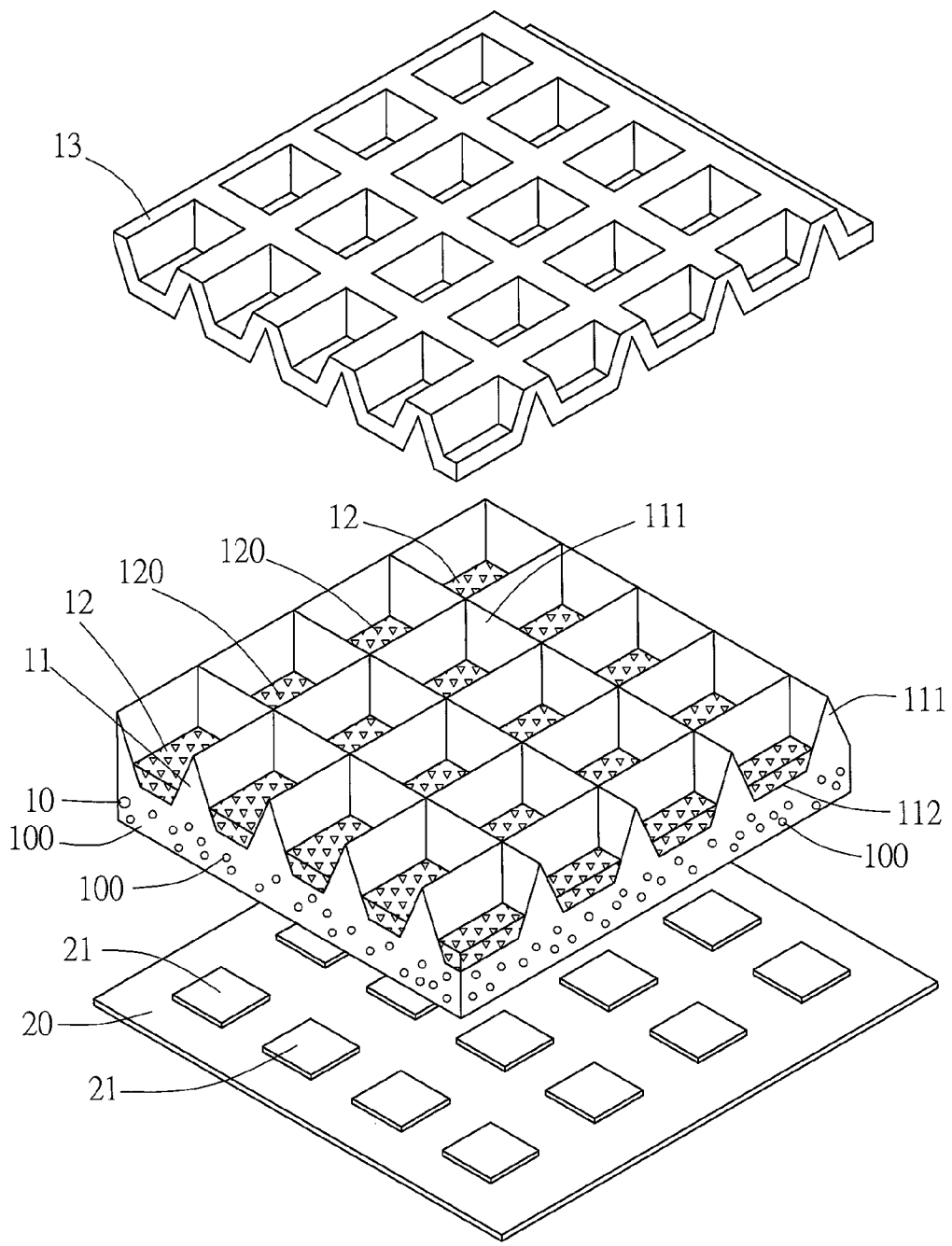
FIG. 2 is a three-dimensional exploded schematic diagram of an embodiment of the quantum dot light diffuser plate of the present invention installed on a backlight module.

Please refer to FIG. 1 and FIG. 2, which are respectively a cross-sectional schematic diagram and a three-dimensional exploded schematic diagram of an embodiment of the quantum dot light diffuser plate of the present invention installed on a backlight module. In this embodiment, the backlight module of the present invention comprises, from bottom to top, a substrate 20, a plurality of light-emitting elements 21, and a diffuser plate. The diffuser plate comprises: a plate body 10, a plurality of microstructures 11, a quantum dot layer 12, and a water-blocking and gas-blocking layer 13.

A circuit layout is provided on the substrate 20. A plurality of light-emitting elements 21 are arranged on the substrate 20 in an array form and are electrically coupled to the circuit layout. In the present invention, the light-emitting elements 21 are blue light-emitting diodes (LEDs), which can emit blue light 211 upward toward the plate body 10 of the diffuser plate. In this embodiment, the light-emitting elements 21 can be conventional blue LEDs, blue Mini LEDs or even blue Micro LEDs. A reflection layer (not numbered) is disposed on the top surface of the substrate 20. The reflection layer can be white or other colors or surfaces with better light reflection effect, and is used to reflect the light upward toward the plate body 10 of the diffuser plate. The base material of the plate body 10 of the diffuser plate can be an non-crystalline or semi-crystalline plasticized material, and the base material includes at least one of the following: polycarbonate (PC), polystyrene (PS), polymethyl methacrylate (PMMA, commonly known as acrylic), polyethylene (PE), polypropylene (PP), polyethylene terephthalate (PET), or a copolymer of any of the foregoing materials. In this embodiment, the plate body 10 is a single-layer structure with polystyrene (PS) as the base material, and the thickness of the plate body 10 is preferably between 0.8 mm and 2.5 mm. The plate body 10 of the diffuser plate is located above the substrate 20 and adjacent to the substrate 20. Generally, there are no other elements between the plate body 10 of the diffuser plate and the light-emitting elements 21 provided on the substrate 20. The quantum dot layer 12 needs uniform blue light intensity to convert red/green light and mix into uniform white light. Because the light intensity in the surrounding (edge) area is lower than the light intensity in the central area of the backlight display, it is easy to have insufficient red/green light conversion, resulting in the phenomenon of bluish light around the edge area of the backlight display. The plate body 10 of the present invention is formed by foam extrusion molding, and includes a plurality of microbubbles 100 in the plate body 10, which has a higher light refraction effect, improves the light intensity in the surrounding edge area of the backlight display, and further improves the problem of bluish light. In an embodiment, diffusing particles can be added to the plate body 10 of the diffuser plate of the present invention, and the diffusing particles can be chosen from commercially known products in the market to further improve the light diffusing effect of the diffuser plate.

In this embodiment, the applicable range of the weight reduction rate of the plurality of microbubbles 100 to the plate body 10 is 10-35%, but the preferred implementation range is that the weight reduction rate of microbubbles 100 to the plate body 10 is 15-25%, and the average size of the microbubbles 100 is between 60~800 mm. Wherein, the calculation formula of the weight reduction rate is:

weight reduction rate (%)=$(W1-W2)/W2*100\%$;

$W1=H*(L1*L2*D)$;

wherein:
H is the average thickness of the plate body (mm);
L1 is the length of the plate body (mm);
L2 is the width of the plate body (mm);
D is the density of the raw material of the plate body (g/mm$^3$);
W1 is the theoretical weight (g) of the plate body, that is, the weight when the microbubbles are not included;
W2 is the actual weight (g) of the plate body, that is, the actual weight of the plate body containing a plurality of the microbubbles is actually weighed by a scale.

In this embodiment, a plurality of the microbubbles 100 are generated by adding a foaming agent and a nucleating agent in an appropriate amount during the foam extrusion molding process of the plate body 10. The nucleating agent comprises at least one of the following: calcium carbonate, silicon dioxide, calcium oxide. The practical range of the weight percentage of the added nucleating agent is 0.01%-5%, but the preferred range is 0.1%-0.5%. The weight reduction rate of the microbubbles 100 can be controlled by the amount of the foaming agent added, and the control method of the bubble size of the microbubbles 100 can be the addition of the nucleating agent and the adjustment of the process temperature.

In this embodiment, the diffuser plate comprises: a plate body 10, a plurality of microstructures 11, a quantum dot layer 12 and a water-blocking and gas-blocking layer 13. The plate body 10 has an upper surface and a lower surface, and the lower surface faces the substrate 20. A plurality of the microstructures 11 are disposed on the upper surface of the plate body 10 in an array form, and a plurality of convex portions 111 and a plurality of concave portions 112 are formed on the upper surface of the plate body 10. The plurality of the concave portions 112 are separated by the plurality of the convex portions 111, so the plurality of the concave portions 112 are independent and do not communicate with each other. The quantum dot layer 12 is disposed at the plurality of concave portions 112 on the upper surface of the plate body 10 in such a manner that, the quantum dot layer 12 is not provided at the plurality of convex portions 111. The thickness of the quantum dot layer 12 is t1, the distance from a top of the convex portions 111 to a bottom of the concave portions 112 is t2, wherein t1<t2. In other words, the height t2 of the convex portion 111 of the microstructure 11 is larger than the thickness t1 of the quantum dot layer 12. The separated portions of the quantum dot layer 12 located in different concave portions 112 are not connected to each other. The water-blocking and gas-blocking layer 13 is disposed on the entire upper surface of the plate body 10 and is closely adhered to cover the plurality of convex portions 111 and the separated portions of the quantum dot layer 12. The water-blocking and gas-blocking layer 13 can isolate and avoid the external moisture and oxygen from invading the upper surface of the separated portions of the quantum dot layer 12. The thickness of the water-blocking and gas-blocking layer 13 is t3, which can be selected from existing commercially available water-blocking and gas-blocking films, which is directly attached on the convex portions 111 of the microstructures 11 and quantum dot layer 12 on the upper surface of the plate body 10. The distance between two adjacent convex portions 111 is P. In this embodiment, the quantum dot layer 12 comprises a plurality of quantum dots 120 (QD for short). The quantum dots 120 can be selected from existing commercially available nanocrystal semiconductor materials, which are composed of II-VI, III-V or IV-VI group elements. The grain diameter of each of the quantum dots 120 is between 2 nm and 10 nm. Wherein, the light emission wavelengths of the plurality of quantum dots 120 in the quantum dot layer 12 may be between 490 nm and 650 nm. In this embodiment, the plurality of quantum dots 120 include a plurality of green quantum dots with light emission wavelengths of 520-530 nm and a plurality of red quantum dots with light emission wavelengths of 620-630 nm. The blue light 211 emitted upward by the light-emitting elements 21 can be mixed into white light 212 after passing through the quantum dot layer 12 and emitted upward from the upper surface of the plate body 10.

In this embodiment, the applicable range of the thickness t1 of the quantum dot layer 12 is 5-150 µm, but the preferred implementation range of t1 is 10-40 µm. The applicable range of the distance t2 between the tops of the convex portions 111 and the bottoms of the concave portions 112 (or the height of the convex portions) is 6-200 µm, but the preferred implementation range of t2 is 25-50 µm. In addition, t1<t2. The applicable range of the thickness t3 of the water-blocking and gas-blocking layer 13 is 5-100 µm, but the preferred range of t3 is 10-30 µm. The maximum width of the convex portions 111 is 50-500 µm. The applicable range of the distance P between the two adjacent convex portions 111 is between 50-1000 µm, but the preferred implementation range of P is 250-500 µm.

Figure 3E:
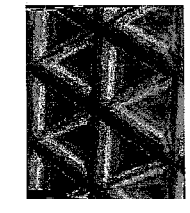
FIG. 3A to FIG. 3E are schematic diagrams of several different embodiments of the microstructures of the quantum dot light diffuser plate of the present invention, respectively.
Figure 3D:
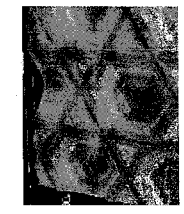
Figure 3C:
Figure 3B:
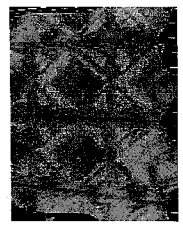
Figure 3A:

Please refer to FIG. 3A to FIG. 3E, which are schematic diagrams of several different embodiments of the microstructures of the quantum dot light diffuser plate of the present invention, respectively. In the present invention, the microstructures include a plurality of N-sided pyramids, wherein N is a positive integer greater than or equal to three. In addition, the microstructures can be composed of a single shape of pyramid, or a combination of two or more different shapes of pyramids. The shape of the pyramid varies with the shape of its bottom, and the name is different, and it depends on the polygon of the bottom. For example, a pyramid with a triangular bottom is called a triangular pyramid, a pyramid with a square bottom is called a square pyramid, etc. A pyramid with an N-sided bottom as its base has N+1 vertices, N+1 faces, and 2N edges. The dual polyhedron of a pyramid is a pyramid of the same shape, for example, the dual polyhedron of a square pyramid is an inverted square pyramid. In the embodiment shown in FIG. 3A, each microstructure presents a triangular pyramid (N=3) in a top view. As shown in FIG. 3B, the plurality of microstructures includes a combination of two different pyramids, a hexagonal pyramid (N=6) and a triangular pyramid (N=3) in top view. As shown in FIG. 3C, each microstructure presents a quadrangular pyramid (N=4), that is, a square pyramid or a pyramid-shaped pyramid, in a top view. As shown in FIG. 3D, the plurality of microstructures include a combination of two different pyramids, a quadrangular pyramid (N=4) and a triangular pyramid (N=3) in top view. As shown in FIG. 3E, each microstructure presents a quadrangular pyramid (N=4) in the top view, that is, a square pyramid or a pyramid-shaped pyramid; however, the width of the convex portion of each microstructure in the Y-axis direction is greater than the width of the convex portion in the X-axis direction.

In the present invention, several pyramid-shaped microstructures with different depths are arranged on the upper surface of the plate body of different diffuser plates to be tested with a quantum dot (QD) layer of the same thickness, in order to compare the degree of marginal failure achieved by microstructures with different depths after the environmental tests. Table 1 below shows the structural information of each comparative example tested. For example, the upper surface of the diffuser plate of Comparative Example 1 is "flat", so the depth and spacing of the surface microstructures are both "NA", which is 0. In other words, the quantum dot (QD) layer is attached to the upper surface of the diffuser plate in the form of a whole flat continuous QD film, and the QD film thickness is 20 µm. In Comparative Example 1, after the environmental test at 60° C. temperature, 90% humidity and 1000 running-hours (60° C. 90% RH-1000 hr environmental test), it was found that the failure degree of the quantum dot layer around the edge of the diffuser plate reached a width of 1 cm. The upper surface of the diffuser plate of Comparative Example 2 is "matte", and the depth of its surface microstructure is "Ra15". In other words, the quantum dot (QD) layer is coated on the upper surface of the diffuser plate in the form of a whole continuous surface, and the thickness of the QD layer is 20 µm. In Comparative Example 2, after the environmental test at 60° C. 90% RH-1000 hr, it was found that the failure degree of the quantum dot layer around the edge of the diffuser plate reached a width of 1 cm. The depth of the microstructures arranged on the upper surface of the diffuser plate of Comparative Example 3 is only 5 µm, and the thickness of the quantum dot (QD) layer is 20 µm; that is, the thickness of the quantum dot (QD) layer is greater than the depth of the microstructures. In Comparative Example 3, after the environmental test at 60° C. 90% RH-1000 hr, it was found that the failure degree of the quantum dot layer around the edge of the diffuser plate reached a width of 1 cm. The depth of the microstructures arranged on the upper surface of the diffuser plate according to Embodiment 1 of the present invention is 30 µm, and the thickness of the quantum dot (QD) layer is 20 µm; that is, the thickness of the quantum dot (QD) layer is less than the depth of the microstructures. In Embodiment 1, after the environmental test at 60° C. 90% RH-1000 hr, it was found that the failure degree of the quantum dot layer around the edge of the diffuser plate is only 0.2 cm wide. It can be seen that when the thickness of the quantum dot (QD) layer is smaller than the depth of the microstructures (as in Embodiment 1), the degree of edge failure of the quantum dot layer can be greatly reduced. According to Embodiment 2 of the present invention, the upper and lower surfaces of the diffuser plate are both provided with microstructures and QD layers; in which, on both the upper and lower surfaces, the depth of the microstructures is 30 µm, while the thickness of the QD layer is 15 µm. That is, the thickness of each quantum dot (QD) layer is not only smaller than the depth of the microstructures, but also smaller than the thickness of the quantum dot layer in Embodiment 1. In Embodiment 2, after the environmental test at 60° C. 90% RH-1000 hr, it was found that the failure degree of the quantum dot layer around the edge of the diffuser plate is only 0.15 cm wide (it is due to the reduction in the thickness of each quantum dot layer), and the brightness is increased to 380 cd/m2 (it is due to the upper and lower surfaces of the diffuser plate are both provided with microstructures and quantum dot layers), which performs better than Embodiment 1. It can be seen that, when the upper and lower surfaces of the diffuser plate are provided with microstructures and quantum dot layers (as in Embodiment 2), better effects can be achieved.

TABLE 1

The comparison table of the edge failure degree caused by the microstructures of different depths on the surface of the diffuser plate after the environmental test

| Item | diffuser plate | depth of micro-structure (μm) | spacing of micro-structure (μm) | QD film | thickness of QD layer (μm) | brightness (cd/m$^2$) | 60° C. 90% RH-1000 hr edge failure |
|---|---|---|---|---|---|---|---|
| Comparative Example 1 | flat | NA | NA | YES | 20 | 300 | 1 cm |
| Comparative Example 2 | matte | Ra15 | — | NO | 20 | 300 | 1 cm |
| Comparative Example 3 | micro-structures on upper surface | 5 | 300 | NO | 20 | 300 | 1 cm |
| Embodiment 1 | micro-structures on upper surface | 30 | 300 | NO | 20 | 300 | 0.2 cm |
| Embodiment 2 | micro-structures on upper surface | 30 | 300 | NO | 15 | 380 | 0.15 cm |
|  | micro-structures on lower surface | 30 | 300 | NO | 15 |  |  |

The present invention improves the light diffusion effect and reduces the phenomenon of blue light around the backlight module by adding diffusing particles and a foaming agent to generate micro-bubbles in the plate body of the diffuser plate. The applicant of the present invention provides a plurality of diffuser plates with different weight ratios of foaming agents added to achieve different micro-bubble weight reduction ratios (as shown in Table 2 below, Embodiments 3-4 and Comparative Examples 4-8), and measures the brightness and distance of the surrounding blue light phenomenon after each light diffuser plate is assembled in the backlight module, in order to compare the relationship between the weight reduction ratios (%) of the micro-bubbles contained in the light diffuser plates and the brightness values and the distances of the blue light phenomenon around the backlight module. Table 2 below shows the structural information of each light diffuser plate example/embodiment tested and compared. It can be seen from Table 2 that, different proportions of foaming agents make the proportion of micro-bubbles contained in the plate body of the diffuser plate different, which will affect the performance of the luminous uniformity (MURA) of the backlight module provided with the diffuser plate. The more the foaming agent is added, the better the MURA shading effect, but it will cause too much loss of brightness (<3%); wherein, the weight reduction ratio of the micro-bubbles is preferably 15~25%, such as Comparative Examples 5-6 and Embodiment 4, which can achieve the relatively best comprehensive performance in terms of brightness and MURA shading effect.

TABLE 2 a comparison table of different weight reduction ratios of micro-bubbles contained in the differ plate with respect to brightness values and the distances of surrounding blue light phenomenon

| Item | Ingredient addition (%) | | QD wavelength (nm) | | thickness (mm) | TT (mm) | brightness (cd/m$^2$) | weight reduction ratio (%) | distances of blue light phenomenon |
|---|---|---|---|---|---|---|---|---|---|
|  | diffusing particle + foaming agent | amount of foaming agent added | Green | Red | | | | | |
| Embodiment 3 | 10 | Not Added | 525 | 626 | 1.48 | 39.17 | 220 | — | 1 cm |
| Comparative Example 4 | 10 | 1.5 | 525 | 626 | 1.489 | 45.8 | 240 | 8 | 0.8 cm |
| Comparative Example 5 | 10 | 2.5 | 525 | 626 | 1.48 | 40.6 | 220 | 15 | 0.5 cm |
| Embodiment 4 | 10 | 3 | 525 | 626 | 1.495 | 37.50 | 215 | 20 | 0.2 cm |
| Comparative Example 6 | 10 | 4 | 525 | 626 | 1.486 | 34.21 | 200 | 25 | 0.1 cm |

TABLE 2-continued a comparison table of different weight reduction ratios of micro-bubbles contained in the differ plate with respect to brightness values and the distances of surrounding blue light phenomenon

| | Ingredient addition (%) | | QD wavelength (nm) | | | | | | |
|---|---|---|---|---|---|---|---|---|---|
| Item | diffusing particle + foaming agent | amount of foaming agent added | Green | Red | thickness (mm) | TT (mm) | brightness (cd/m$^2$) | weight reduction ratio (%) | distances of blue light phenomenon |
| Comparative Example 7 | 10 | 4.5 | 525 | 626 | 1.479 | 29.95 | 170 | 31 | 0 cm |
| Comparative Example 8 | 10 | 5 | 525 | 626 | 1.48 | 26.52 | 160 | 36 | 0 cm |

In an embodiment of the present invention, the manufacturing method of the quantum dot light diffuser plate comprises the following steps. First, a plate body is manufactured by using a foam extrusion molding process. The plate body has an upper surface and a lower surface, and a plurality of microstructures are formed on at least the upper surface of the plate body. The microstructures are arranged on the upper surface of the plate body in an array form, and these microstructures include a plurality of convex portions and a plurality of concave portions formed on the upper surface of the plate body. The concave portions are separated by the convex portions, so the concave portions are independent and do not communicate with each other. Next, a quantum dot layer is coated on the plurality of the concave portions on the upper surface of the plate body by a coating process. Wherein, the thickness of the quantum dot layer is t1, the distance from a top of the convex portions to a bottom of the concave portions is t2, and t1<t2. After that, through a sticking process, a water-blocking and gas-blocking layer is attached to the upper surface of the plate body and covers the plurality of the convex portions and the quantum dot layer. In the present invention, the water-blocking and gas-blocking layer is attached to the upper surface of the diffuser plate to prevent the water vapor from invading the quantum dot layer from the upper surface, and the convex portions of the microstructures prevent the water vapor from entering the quantum dot layer from the side end faces of the diffuser plate. Therefore, the distance that the water vapor enters the quantum dot layer from the side end faces is reduced to a minimum. In addition, since the diffuser plate is integrally formed by foam extrusion molding process, subsequent processing and production costs can be reduced, and a relatively high production yield rate can be achieved.

Figure 4:
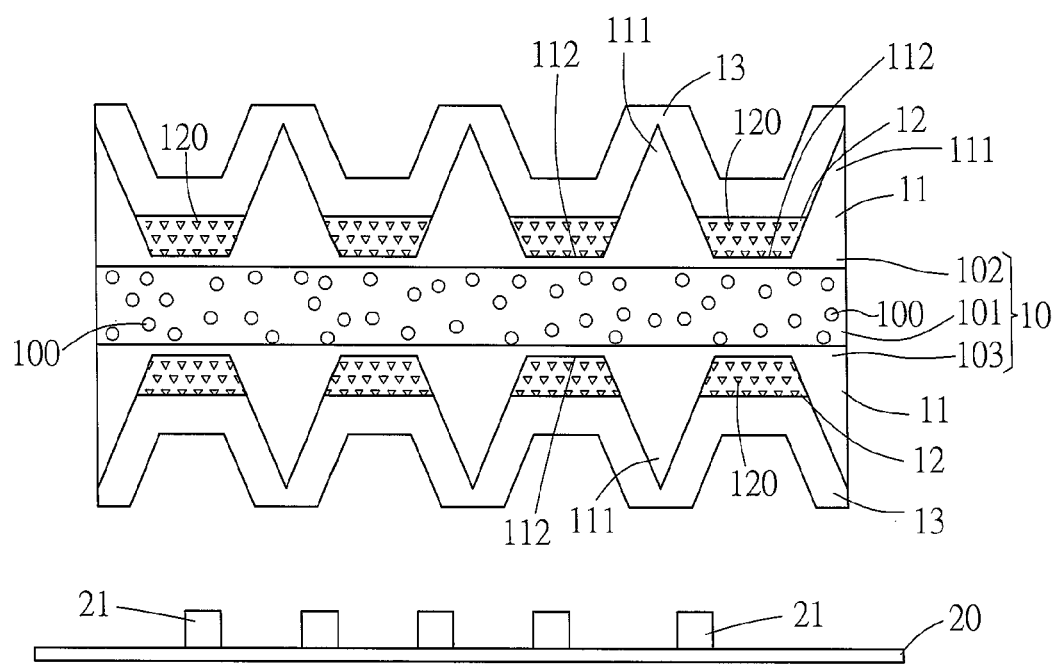
FIG. 4 is a schematic cross-sectional view of another embodiment of the quantum dot light diffuser plate of the present invention installed on a backlight module.

Please refer to FIG. 4, which is a schematic cross-sectional view of another embodiment of the quantum dot light diffuser plate of the present invention installed on a backlight module. Since the structures and functions of most elements of the embodiment shown in FIG. 4 are similar or the same as those of the embodiment shown in FIG. 1, the same or similar elements will be directly given the same names and numbers, and their details will not be repeated. In the embodiment shown in FIG. 4, the plate body 10 is a multi-layer structure composed of at least two layers of different materials by co-extrusion molding process; specially speaking, the plate body 10 is a multi-layer structure composed of a main layer 101, an upper surface layer 102 and a lower surface layer 103; three layers in total. In addition, a plurality of microstructures 11, a quantum dot layer 12, and a water-blocking and gas-blocking layer 13 are respectively disposed on both the upper and lower surfaces of the board body 10. In other words, in the embodiment shown in FIG. 4, not only the upper surface of the plate body 10 is provided with the same plurality of microstructures 11, quantum dot layer 12, and water-blocking and gas-blocking layer 13 as the embodiment shown in FIG. 1, but also the lower surface of the plate body 10 is further provided with the plurality of microstructures 11, quantum dot layer 12, and water-blocking and gas-blocking layer 13. A plurality of the microstructures 11 form a plurality of the convex portions 111 and a plurality of the concave portions 112 on the lower surface of the plate body 10. The concave portions 112 are separated by the convex portions 111, so the plurality of the concave portions 112 on the lower surface of the plate body 10 are independent and not communicated with each other. And, the quantum dot layer 12 located on the lower surface of the plate body 10 is disposed only at the concave portions 112 on the lower surface of the plate body 10. Moreover, the water-blocking and gas-barrier layer 13 on the lower surface of the board body 10 covers the convex portions 111 and the quantum dot layer 12 on the lower surface of the plate body 10. In this embodiment, the structures of the plurality of microstructures 11, the quantum dot layers 12 and the water-blocking and gas-blocking layers 13 disposed on the upper and lower surfaces of the plate body 10 are substantially the same, in addition, the thickness of the quantum dot layers 12 are also smaller than the heights of the convex portions 111 of the microstructures 11.

While the present invention has been particularly shown and described with reference to a preferred embodiment, it will be understood by those skilled in the art that various changes in form and detail may be without departing from the spirit and scope of the present invention.

What is claimed is:

1. A quantum dot light diffuser plate capable of being assembled on a backlight module with a plurality of blue light emitting diodes (LEDs); the backlight module comprising a substrate and the blue LEDs arranged on the substrate in an array form; the quantum dot light diffuser plate being located above the substrate and comprising:
   a plate body, having an upper surface and a lower surface; the lower surface facing the substrate;
   a plurality of microstructures, formed on the upper surface of the plate body in an array form; the microstructures forming a plurality of convex portions and a plurality of concave portions on the upper surface of the plate body; the concave portions being separated by the convex portions, such that the concave parts are independent and not communicated with each other;
   a quantum dot layer, disposed at the plurality of the concave portions on the upper surface of the plate body; wherein, a thickness of the quantum dot layer is t1, a distance from a top of the convex portions to a bottom of the concave portions is t2; wherein t1<t2; and a water-blocking and gas-blocking layer, disposed on the upper surface of the plate body and covering the plurality of the convex portions and the quantum dot layer;

wherein, the plate body comprises one of the following material: polycarbonate (PC), polystyrene (PS), polymethyl methacrylate (PMMA), polyethylene (PE), polypropylene (PP), polyethylene terephthalate (PET);

wherein, the plate body is formed by foam extrusion molding, and includes a plurality of microbubbles in the plate body; a weight reduction rate of the microbubbles to the plate body is 15-25%, and an average size of the microbubbles is between 60~800 µm; wherein, a calculation formula of the weight reduction rate is:

weight reduction rate (%)=$(W1-W2)/W2*100\%$;

$W1=H*(L1*L2*D)$;

wherein:
H is an average thickness of the plate body (mm);
L1 is a length of the plate body (mm);
L2 is a width of the plate body (mm);
D is a density of a raw material of the plate body (g/mm$^3$);
W1 is a theoretical weight (g) of the plate body, that is, the weight when the microbubbles are not included;
W2 is an actual weight (g) of the plate body, that is, the actual weight of the plate body containing a plurality of the microbubbles is actually weighed by a scale.

2. The quantum dot light diffuser plate of claim 1, wherein, the lower surface of the board body is also formed with the plurality of the microstructures, the quantum dot layer and the water-blocking and gas-blocking layer; the microstructures form the convex portions and the concave portions on the lower surface of the plate body; the concave portions on the lower surface are separated by the convex portions, so the concave portions on the lower surface of the plate body are independent and not communicated with each other; the quantum dot layer located on the lower surface of the plate body is disposed at the concave portions on the lower surface of the plate body.

3. The quantum dot light diffuser plate of claim 1, wherein, a plurality of quantum dots is included in the quantum dot layer; the quantum dots are nanocrystal semiconductor materials composed of II-VI, III-V or IV-VI group elements; a grain diameter of each of the quantum dots is between 2 nm and 10 nm; wherein, the quantum dots include a plurality of green quantum dots with light emission wavelengths of 520-530 nm and a plurality of red quantum dots with light emission wavelengths of 620-630 nm.

4. The quantum dot light diffuser plate of claim 1, wherein, the microstructures include a plurality of N-sided pyramids, wherein N is a positive integer greater than or equal to three; t2 is between 6~200 µm; a thickness of the water-blocking and gas-blocking layer is t3, and t3 is between 5~100 µm.

5. The quantum dot light diffuser plate of claim 4, wherein, t2 is between 25 and 50 µm, t1 is between 10 and 40 µm, and t3 is between 10 and 30 µm.

6. The quantum dot light diffuser plate of claim 1, wherein, a maximum width of the convex portion is between 50 and 500 µm, and a distance between two adjacent convex portions is between 50 and 1000 µm.

7. The quantum dot light diffuser plate of claim 1, wherein, the microbubbles are generated by adding a foaming agent and a nucleating agent during the foam extrusion molding of the plate body; the nucleating agent comprises at least one of the following: calcium carbonate, silicon dioxide, and calcium oxide; a weight percentage of the added nucleating agent is 0.1%-0.5%.

8. The quantum dot light diffuser plate of claim 1, wherein, the plate body is a multi-layer structure composed of at least two layers of different materials by co-extrusion molding.

9. A method for making a quantum dot light diffuser plate, comprising:

manufacturing a plate body by using a foam extrusion molding process; the plate body having an upper surface and a lower surface; and, a plurality of microstructures being formed on at least the upper surface of the plate body; the microstructures being arranged on the upper surface of the plate body in an array form; the microstructures forming a plurality of convex portions and a plurality of concave portions on the upper surface of the plate body; the concave portions being separated by the convex portions, such that the concave portions are independent and do not communicate with each other;

coating a quantum dot layer on the concave portions on the upper surface of the plate body by a coating process; wherein, a thickness of the quantum dot layer is t1, a distance from a top of the convex portions to a bottom of the concave portions is t2; wherein t1<t2; and through a sticking process, attaching a water-blocking and gas-blocking layer onto the upper surface of the plate body in order to cover the plurality of the convex portions and the quantum dot layer;

wherein, the plate body comprises one of the following material: polycarbonate (PC), polystyrene (PS), polymethyl methacrylate (PMMA), polyethylene (PE), polypropylene (PP), polyethylene terephthalate (PET);

wherein, the plate body is formed by foam extrusion molding, and includes a plurality of microbubbles in the plate body; a weight reduction rate of the microbubbles to the plate body is 15-25%, and an average size of the microbubbles is between 60~800 µm; wherein, a calculation formula of the weight reduction rate is:

weight reduction rate (%)=$(W1-W2)/W2*100\%$;

$W1=H*(L1*L2*D)$;

wherein:
H is an average thickness of the plate body (mm);
L1 is a length of the plate body (mm);
L2 is a width of the plate body (mm);
D is a density of a raw material of the plate body (g/mm$^3$);
W1 is a theoretical weight (g) of the plate body, that is, the weight when the microbubbles are not included;
W2 is an actual weight (g) of the plate body, that is, the actual weight of the plate body containing a plurality of the microbubbles is actually weighed by a scale.

10. The method of claim 9, wherein, the lower surface of the board body is also formed with the plurality of the microstructures, the quantum dot layer and the water-blocking and gas-blocking layer; the microstructures form the convex portions and the concave portions on the lower surface of the plate body; the concave portions on the lower surface are separated by the convex portions, so the concave portions on the lower surface of the plate body are independent and not communicated with each other; the quantum dot layer located on the lower surface of the plate body is disposed at the concave portions on the lower surface of the plate body.

11. The method of claim 9, wherein, a plurality of quantum dots is included in the quantum dot layer; the quantum dots are nanocrystal semiconductor materials composed of II-VI, III-V or IV-VI group elements; a grain diameter of each of the quantum dots is between 2 nm and 10 nm; wherein, the quantum dots include a plurality of green quantum dots with light emission wavelengths of 520-530 nm and a plurality of red quantum dots with light emission wavelengths of 620-630 nm.

12. The method of claim 9, wherein, the microstructures include a plurality of N-sided pyramids, wherein N is a positive integer greater than or equal to three; t2 is between 6~200 μm; a thickness of the water-blocking and gas-blocking layer is t3, and t3 is between 5~100 μm.

13. The method of claim 12, wherein, t2 is between 25 and 50 μm, t1 is between 10 and 40 μm, and t3 is between 10 and 30 μm.

14. The method of claim 9, wherein, a maximum width of the convex portion is between 50 and 500 μm, and a distance between two adjacent convex portions is between 50 and 1000 μm.

15. The method of claim 9, wherein, the microbubbles are generated by adding a foaming agent and a nucleating agent during the foam extrusion molding of the plate body; the nucleating agent comprises at least one of the following: calcium carbonate, silicon dioxide, and calcium oxide; a weight percentage of the added nucleating agent is 0.1%-0.5%.

16. The method of claim 9, wherein, the plate body is a multi-layer structure composed of at least two layers of different materials by co-extrusion molding.

* * * * *